Feb. 19, 1952 P. R. GRAY 2,586,534

PRIVATE BRANCH EXCHANGE TRUNK CIRCUIT

Filed Dec. 29, 1948 3 Sheets-Sheet 1

INVENTOR
P. R. GRAY
BY
R. O. Covell
ATTORNEY

Feb. 19, 1952 P. R. GRAY 2,586,534

PRIVATE BRANCH EXCHANGE TRUNK CIRCUIT

Filed Dec. 29, 1948 3 Sheets-Sheet 2

INVENTOR
P. R. GRAY

BY R. D. Covell

ATTORNEY

Feb. 19, 1952 P. R. GRAY 2,586,534

PRIVATE BRANCH EXCHANGE TRUNK CIRCUIT

Filed Dec. 29, 1948 3 Sheets-Sheet 3

INVENTOR
P. R. GRAY
BY
R. O. Covell
ATTORNEY

Patented Feb. 19, 1952

2,586,534

UNITED STATES PATENT OFFICE 2,586,534

PRIVATE BRANCH EXCHANGE TRUNK CIRCUIT

Preston R. Gray, Elmhurst, N. Y., assignor to Bell Telephone Laboratories, Incorporated, New York, N. Y., a corporation of New York Application December 29, 1948, Serial No. 67,835

4 Claims. (Cl. 179—27)

This invention relates to telephone systems comprising dial central office and private branch exchange equipment and particularly to the trunk circuits associated with trunks between a central office and private branch exchange.

Objects of the invention are in increased efficiency in the use of trunks between a dial central office and an automatic private branch exchange and the provision of trunk circuits arranged for toll diversion and composite signaling over the trunks between the central office and the private branch exchanges.

A feature of the invention is a telephone system comprising dial central office and private branch exchange equipments in which the trunk circuits associated with the trunks from the branch exchange to the central office are arranged for two-way composite signaling and arranged so that toll calls originating in the branch exchange, will be automatically diverted to an attendant's position in the branch exchange responsive to a signal transmitted over a composite signaling channel from the central office to the branch exchange upon connection of a trunk from the branch exchange to a trunk outgoing to a toll operator position.

Figure 1:
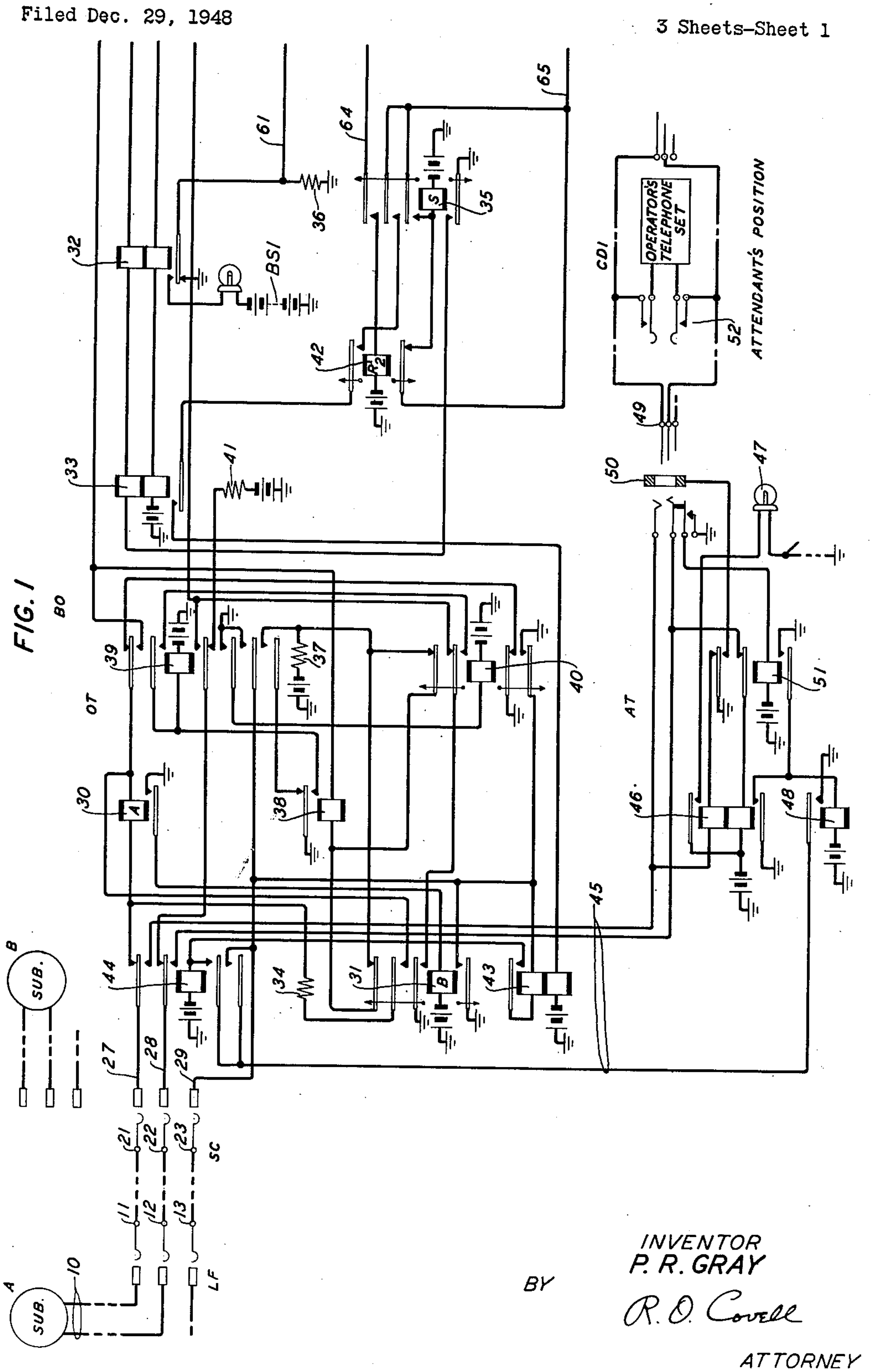
Figure 2:
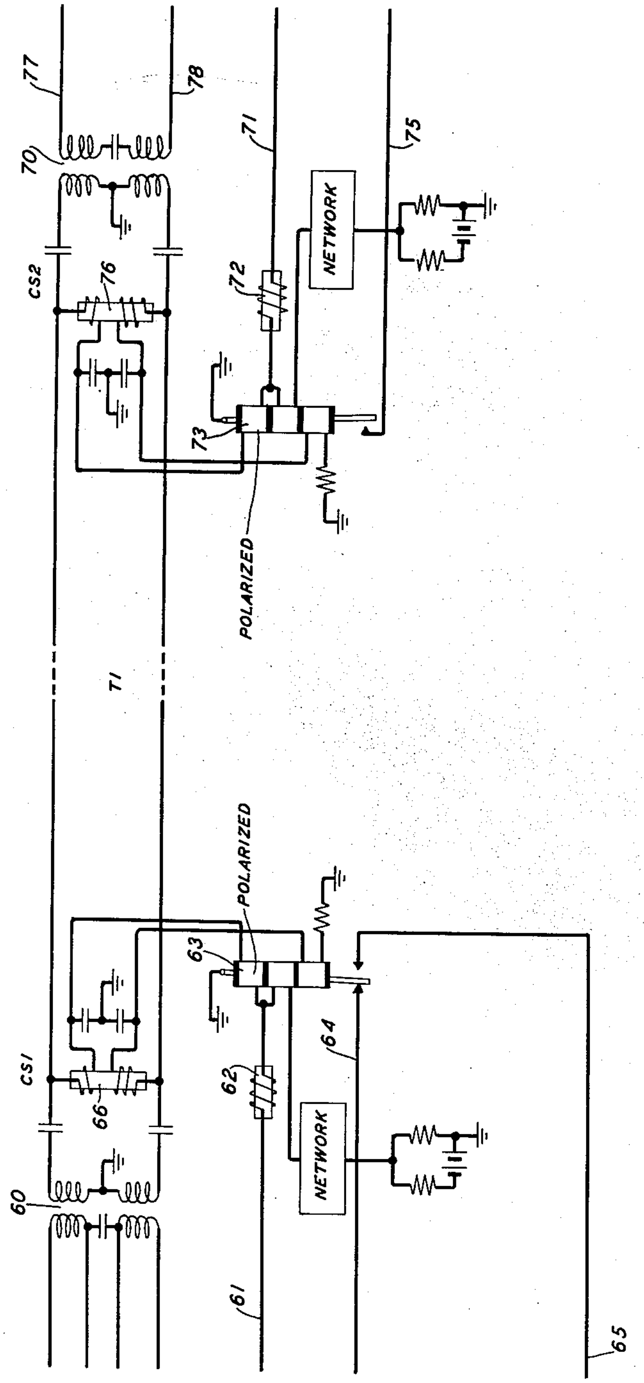
Figure 3:
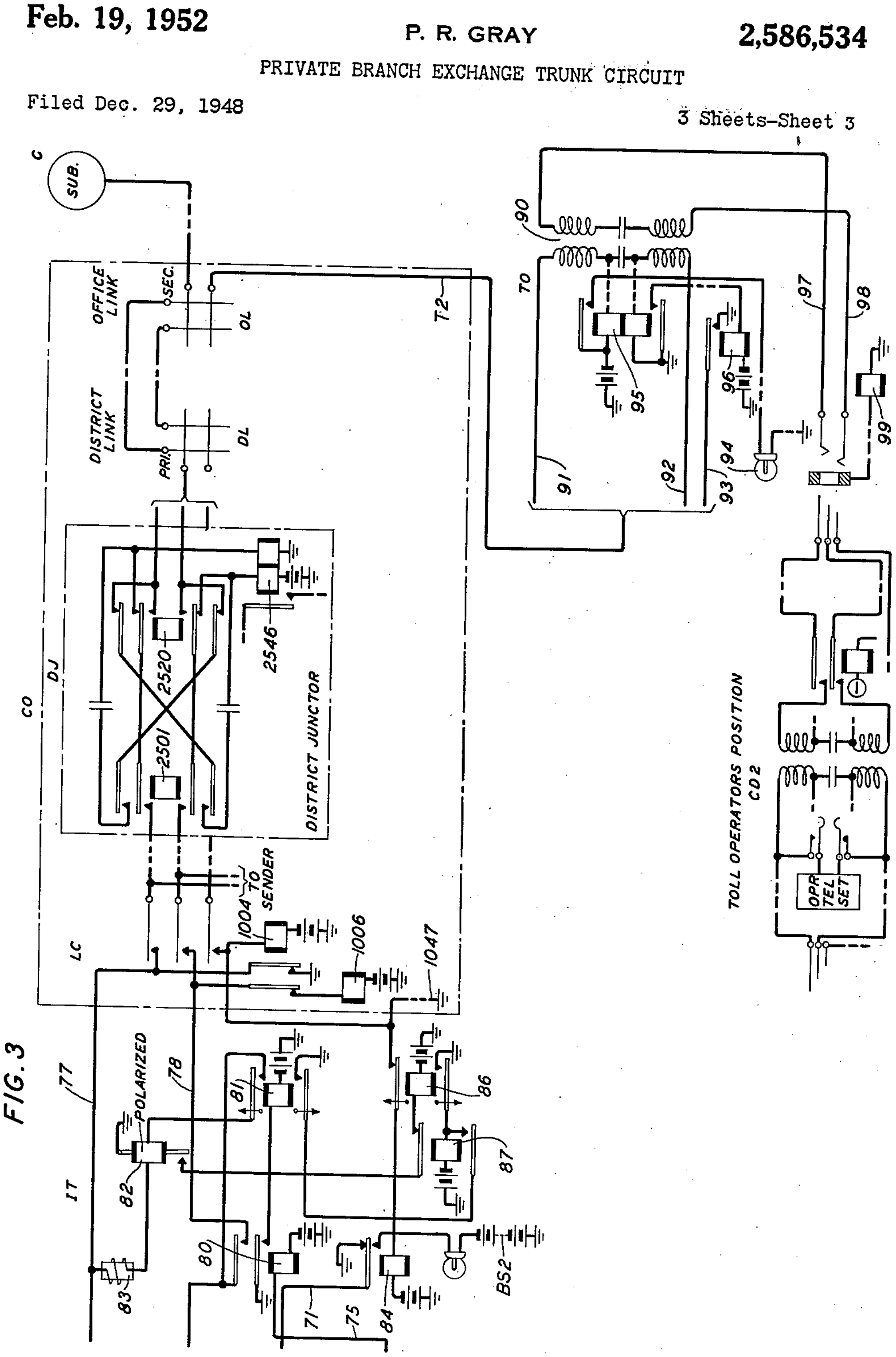

A system arranged in accordance with the invention is represented schematically in the drawings which consist of three figures. Figs. 1, 2 and 3, when placed adjacent each other in the order named represent a dial private branch exchange BO including an attendant's position, a dial central office CO, and a toll operator position.

Fig. 1 shows a private branch exchange BO in which A and B represent subscriber stations, LF represents a line finder switch, SC represents a selector-connector switch, OT represents an outgoing trunk circuit, AT represents an attendant's trunk circuit associated with local trunk 45 leading to an attendant's position, and CD1 represents a cord circuit at the attendant's position.

Fig. 2 shows composite signaling circuit CS1 connecting trunk circuit OT of Fig. 1 to the P. B. X end of a trunk line T1 and a similar signaling circuit CS2 connecting incoming trunk circuit IT of Fig. 3 to the central office end of trunk line T1.

Fig. 3 shows a cross-bar central office CO in which C represents a subscriber station, IT represents an incoming trunk circuit associated with trunk line T1 from the P. B. X, LC represents a line circuit, DJ represents a district junctor circuit, DL represents a district link, OL represents an office link, TO represents a trunk circuit associated with a trunk leading to toll operator's positions, and CD2 represents a cord at a toll operator's position.

Each of stations A, B and C are of the type usually employed in automatic telephone systems and include a dial or other impulse sender for use in establishing connections with other stations in the system.

The line finder switch LF and the selector-connector switch SC are of the well-known two-motion step-by-step type. For a complete description of the structure of a step-by-step switch and the operation of a system employing such switches, reference may be had to chapter 3 of the second edition of "Automatic Telephony" by Smith and Campbell, published in 1921. For a description of the operation of a step-by-step switch when used as a line finder, reference may be had to Patent No. 1,799,654 granted to R. L. Stokely, April 7, 1931. For a description of the operation of a step-by-step switch when used as a selector-connector in a branch exchange, reference may be had to Patent No. 1,675,886 granted to A. E. Hague, April 3, 1928.

The composite signaling circuits CS1 and CS2 are of the well-known type in which one conductor of the trunk T1 is used for signaling purposes and the other for earth potential compensation. These arrangements may be modified in the well-known way to obtain three trunk channels over two two-conductor trunk lines.

The line circuit LC, district junctor DJ, district link DL, and office link OL are of the type employed in a cross-bar central office and for a complete description of the apparatus and operation of such equipment, reference may be had to Patent No. 2,235,803 of June 17, 1938, and Patent No. 2,089,921 of August 10, 1937, granted to W. W. Carpenter.

Upon origination of a call at station A in the branch exchange, the line finder switch LF is operated to find and connect the calling line to a selector-connector switch SC which has access both to branch office lines and to trunks leading to the central office. If the number of lines in the branch office were large enough, both selector switches and connector switches would be provided instead of selector-connector switches, for use in completing calls between stations in the branch office; and in this case, the trunks to the central office would be connected to terminals in the banks of the selector switches. The selector-connector SC is operated in response to dial impulses created by the dialing of the first digit of the number of the called station to select a corresponding group of terminals, and if the called station is in the branch office, is thereupon operated in response to dial pulses created by the dialing of the second digit of the number of the called station to select a set of terminals to which the called station is connected. If the called station is in or beyond the central office, the selector-connector is operated in response to dial impulses created by dialing the first digit of the directory number of the called station to select a group of terminals connected to trunks leading to the central office and to seize an idle trunk in this group.

Assuming the calling line 10 to have been extended through brushes 11 and 12 of line finder switch LF and brushes 21 and 22 of selector-connector switch SC to conductors 27 and 28 of outgoing trunk circuit OT, the line relay 30 operates. The circuit for operating relay 30 is traced from battery through resistor 41, inner-lower back contact of relay 39, inner-upper back contact of relay 44, conductor 28, selector brush 22, line finder brush 12, calling line 10, line finder brush 11, selector brush 21, conductor 27, outer-upper back contact of relay 44, winding of relay 30, outer-upper back contact of relay 39, and lower back contact of relay 40 to ground. Relay 30 closes a circuit for operating relay 31; and relay 31 connects ground to sleeve conductor 29 to hold the selector-connector and line finder switches and to hold the cut-off relay (not shown) of line 10 all in a well-known manner. The operation of relay 31 also connects resistance 34 in parallel with the winding of relay 30 to reduce the impedance of the talking connection, when closed. Relay 31 closes a circuit from ground through its inner-upper front contact, the inner-upper back contact of relay 40, the lower left winding of repeating coil 60 and the lower winding of each of relays 32 and 33 to battery. Relays 32 and 33 are thereby operated. The operation of relay 33 performs no useful function at this time but the operation of relay 32 disconnects ground from conductor 61 and connects signaling battery BS1 to this conductor, thence through retard coil 62, upper winding of relay 63 and upper winding of retard coil 66 to the upper conductor of trunk T1, to operate signaling relay 73 of composite signaling circuit CS2 in the central office. Relay 73, operated, closes a circuit for operating relay 80 of the incoming trunk circuit IT. Relay 80, operated, operates relay 81 which closes a circuit through the winding of relay 82 and retard coil 83 to operate the line relay 1006 of the line circuit LC. Relay 82 is polarized and does not operate at this time because the current through its winding is in the non-operating direction. The operation of line relay 1006 causes the cross-bar central office equipment to function as on a call originated by a central office station as described in detail on pages 11 to 23 of the aforementioned Patent 2,235,803; and, when the connection has been extended to a sender circuit, the combined cut-off relay and hold magnet 1004 of the line circuit and the sleeve relay 84 of the incoming trunk circuit are operated in parallel through conductor 1047 to ground in the sender link (not shown). When relay 1004 operates, it disconnects the tip and ring conductors 77 and 78 of the incoming trunk circuit IT from the line relay 1006 and extends them to the sender circuit (not shown) and to a district junctor DJ. The operation of relay 84 disconnects ground from conductor 71 and connects signaling battery BS2 through conductor 71, retard coil 72, upper winding of relay 73 and upper winding of coil 76 to the upper conductor of trunk T1 to operate the signaling relay 63 of composite signaling circuit CS1. The operation of relay 63 connects ground to conductor 65, operating relay 35 of the outgoing trunk circuit OT. Relay 35 locks operated through its inner-upper front contact under control of relay 63 and closes a circuit from ground through its lower front contact, upper windings of relays 33 and 32, upper left winding of repeating coil 60, winding of relay 38, a back contact of relay 40 and resistor 37 to battery. Relay 38 operates, closing a circuit for operating relay 39. The operation of relay 39 connects the calling line in series with the left windings of repeating coil 60 and the windings of relays 32 and 33, whereby relays 32 and 33, are held operated under control of the calling subscriber. The operation of relay 39 closes a circuit for operating relay 40. The operation of relay 40 closes a locking circuit for relay 39 and causes the release of relay 38.

Dial tone is now transmitted by the sender in the cross-bar central office to the calling station A in the usual manner. When the calling stations A dials the digits of the called number, the impulses created by the dial of station A are repeated by relay 32 of outgoing trunk circuit OT to relay 73 of composite signaling circuit CS2. The release and reoperation of relay 73 in response to each impulse of the train causes the release and reoperation of relay 80 of incoming trunk circuit IT; whereby relay 80 alternately opens and closes the bridge consisting of relay 82 and retard coil 83 across the tip and ring conductors leading to the sender circuit, thus registering the called number in the sender. Being slow in releasing, relay 81 remains operated during the response of relay 80 to the dial impulses. Relays 30 and 33 of the outgoing trunk circuit may operate and release in response to the dial impulses but relay 31 is slow in releasing and remains operated during the transmission of dial impulses.

If the called number registered in the sender circuit indicates that the subscriber desires connection with a toll operator, the cross-bar office equipment functions, as described for call 11 in the Carpenter Patent 2,235,803, to connect the incoming trunk circuit IT through the district junctor DP, a district link DL and an office link OL to a trunk T2 leading to the toll operator trunk circuit TO. In this case, relays 2501 and 2520 of district junctor DJ are both operated; and the tip and ring conductors 77 and 78 of trunk circuit IT are connected through conductors 91 and 92 of trunk T2, windings of repeating coil 90, and windings of relay 95 of trunk circuit TO, to battery and ground respectively; thereby causing the operation of polarized relay 82 of incoming trunk circuit IT and the operation of relay 95 of trunk circuit TO. The operation of relay 95 lights the trunk lamp 94 at a toll operator position and closes a circuit for operating relay 96. The operation of relay 96 connects ground to sleeve conductor 93 to hold the cross-bar central office equipment in the usual manner. The aforementioned operation of relay 82 closes a circuit for operating 86; and the operation of relay 86 closes a circuit for operating relay 87 and opens the circuit through the winding of relay 84. The operation of relay 87 closes a locking circuit under control of relay 81 and opens the operating circuit of relay 86. Relay 86 is slow in releasing so as to hold open for a predetermined interval of time the operating circuit of relay 84; whereby conductor 71 is disconnected from signaling battery BS2 for a long enough interval to effect the release of relay 63 in the private branch exchange. When relay 86 releases, relay 84 reoperates and signaling battery BS2 is again connected to conductor 71 to cause the reoperation of relay 63 of signaling circuit CS1. Thus relay 63 is released and reoperated as a signal to indicate that the call has been extended to a toll operator trunk.

When relay 63 releases responsive to the aforementioned momentary release of relay 84, the locking circuit of relay 35 is opened and a circuit is closed through conductor 64 for operating relay 42 of outgoing trunk circuit OT. Relay 35 is slow in releasing and its locking circuit is again closed by the reoperation of relay 63; so that relay 35 remains operated. The reoperation of relay 63 closes a circuit for operating relay 43, this circuit being traced from conductor 65 through the middle upper front contact of relay 35, a front contact of relay 42, front contact of relay 33, and the lower winding of relay 43, to battery. The operation of relay 43 closes a circuit through its upper winding and locking contact and the winding of relay 44; whereby relay 44 operates and relay 43 is locked operated under the control of relays 31 and 40. The operation of relay 44 opens the connection between the calling line 10 and repeating coil 60 and connects the calling line through conductors 45 to trunk circuit AT at an intercepting operator's or attendant's position. Upon extension of the connection from the calling line to trunk circuit AT, the line relay 46 of that circuit is operated in series with line 10.

The aforementioned operation of relay 44 opens the circuit through the windings of relay 30, 32 and 33; and these relays release. The release of relay 30 causes the release of relays 31, 39, 40 and 43 but relay 44 is held operated to ground in the trunk circuit AT as hereinafter described. The release of relay 32 disconnects signaling battery BS1 from, and reconnects ground to, conductor 61, thereby causing the release of relay 73 of signaling circuit CS2. The release of relay 73 releases relay 80 of the incoming trunk circuit IT; the release of relay 80 causes the release of relays 81 and 87 in succession; and the release of relay 81 opens the bridge, consisting of relay 82 and retard coil 83, across the tip and ring conductors leading to the toll operator's trunk TO, thus releasing relay 95 of that circuit. The release of relay 95 extinguishes lamp 94, to prevent the answer of the call by the toll operator, and releases relay 96. The release of relay 96 disconnects holding ground potential from conductor 93, thereby releasing 1004, releasing relay 84 of the incoming trunk circuit IT, and causing the return of the cross-bar central office equipment to normal in usual manner. The aforementioned release of relay 84 causes the release of signaling relay 63 of CX signaling circuit CS1 followed by the release of relay 35 of outgoing trunk circuit OT. The release of relay 63 momentarily closes the circuit for operating relay 42 but the operation of relay 42 at this time is without useful function.

The aforementioned operation of relay 46 of trunk circuit AT closes a circuit for lighting lamp 47 and closes a circuit for operating the slow-to-release relay 48. Relay 48 provides a circuit for holding relay 44 operated and connects holding ground potential to sleeve conductor 29 to hold the selector-connector and line finder switches and the cut-off relay of line 10. When the intercepting operator answers the call by inserting the plug 49 of cord CD1 in the answering jack 50, relay 51 operates, causing the release of line relay 46 and closing a holding circuit for relay 48. The operation of key 52 of cord circuit CD1 completes a talking connection between the calling station A and the operator's telephone set. When plug 49 is withdrawn from jack 50 after the receiver is replaced at station A, relays 51, 48 and 44 release in the order named and ground potential is disconnected from sleeve conductor 29, thereby causing the line finder LF and selector-connector SC to be restored to normal in usual manner.

If the number registered in the sender circuit indicates that the call is for a subscriber station C in the cross-bar central office, the cross-bar office equipment functions as described for call 1 in the aforementioned Patent 2,235,803, to connect the incoming trunk IT, through district junctor DJ to district link DL and the office link OL, and through incoming and number group links, which are not shown, to the called subscriber station C. In this case, relay 2501 of the district junctor is operated but relay 2520 is not operated and the tip and ring conductors 77 and 78 of trunk circuit IT are connected through the windings of relay 2546 to ground and battery respectively; whereby the current through the winding of polarized relay 82 of trunk circuit IT is in the non-operating direction. Consequently relay 63 of signaling circuit CS1 is not momentarily released as on the above-described call to a toll operator; and consequently relays 42, 39, 43 and 44 are not operated and the call is not switched to the attendant's position. When the calling subscriber restores the telephone to normal relays 30, 32 and 33 release followed by the release of relay 31. The release of relay 32 connects ground to conductor 61 in place of signaling battery BS1, causing the release of relay 73 of signaling circuit CS2 in the central office. The release of relay 73 causes the successive release of relays 80 and 81. The release of relay 81 opens the bridge across conductors 77 and 78 whereupon the cross-bar equipment is restored to normal in usual manner.

What is claimed is:

1. In a telephone system, a private branch exchange, a central office, a trunk from said branch exchange to said office, signal means connected to the ends of said trunk constituting a composite signaling channel thereover, a toll operator position, trunks for extending calls from said central office to said position, said branch exchange comprising an attendant's position, subscriber lines, automatic switching means for inter-connecting calling and called lines and for connecting calling lines to said trunk to the central office, said central office comprising subscriber lines and automatic switching means for connecting said private branch exchange trunk to a called line or to a trunk to said toll operator position, and means including composite signaling means in said central office effectively responsive to the connection of said trunk from the private branch exchange to a trunk to the toll operator position to transmit a signal over the composite signaling channel of said trunk to said branch exchange, and means in said branch exchange responsive to said signal for transferring the calling line from said trunk to the central office to said attendant's position.

2. In a telephone system comprising a private branch exchange, a central office and a toll operator position, trunk lines between said branch exchange and central office providing talking channels and composite signaling channels, trunks between said central office and said toll operator position, subscriber lines in said branch exchange and in said central office, automatic switching means in said branch exchange for interconnecting calling and called subscriber lines and for connecting a calling subscriber line to a trunk line to the central office, automatic switching means in said central office for interconnecting calling and called subscriber lines and for connecting calling subscriber lines and calling trunk lines from the branch exchange to called lines and to trunks to the toll operator position, and means including composite signaling means in the central office effective upon connection of a calling trunk line from the branch exchange to a trunk to the toll operator position for transmitting a signal over the signaling channel of said trunk to the branch exchange, an attendant's position in the branch exchange, and means in said branch exchange responsive to said signal for switching the calling subscriber line from the trunk line to said attendant's position.

3. In a telephone system comprising a private branch exchange, a central office and a toll operator position, a trunk line between said branch exchange and central office, an outgoing trunk circuit connected to said trunk line in the branch exchange, an incoming trunk circuit connected to said trunk line in the central office, means including composite signaling means connected to said trunk line and to said trunk circuits, an attendant's position in said branch exchange, subscriber lines in said branch exchange and in said central office, automatic switching means in said branch exchange for interconnecting calling and called subscriber lines and for connecting a calling subscriber line to said outgoing trunk circuit and trunk line, trunks from said central office to said toll operator position, automatic switching means in said central office selectively controlled by signals transmitted by said composite signaling means, to connect said incoming trunk circuit to a called subscriber line in the central office or to a trunk to the toll operator position, means comprising a polarized relay in said incoming trunk circuit operatively responsive only to the connection of said incoming trunk circuit to a trunk to to said toll operator position for effecting the transmission of a signal by said composite signaling means to said outgoing trunk circuit, and means in said outgoing trunk circuit controlled by said signal to effect the switching of the calling line in the branch exchange from said trunk line to said attendant's position.

4. In a telephone system comprising a private branch exchange, a central office and a toll operator position, a trunk line between said branch exchange and central office, an outgoing trunk circuit connected to said trunk line in said branch exchange, an incoming trunk circuit connected to said trunk line in said central office, an attendant's position in said branch exchange, subscriber lines in said branch exchange and in said central office, a calling subscriber line in said branch exchange, automatic switching means in said branch exchange connecting said calling line to said outgoing trunk circuit and trunk line, composite signaling means connected to said trunk line and to said trunk circuits, a trunk extending from said central office to said toll operator position, automatic switching means in said central office selectively controlled by said composite signaling means to connect said incoming trunk circuit with a called subscriber line or to said trunk to the toll operator position, means comprising a polarized relay in said trunk circuit operated only upon connection of said incoming trunk circuit to said trunk to the toll operator position, relay means in said incoming trunk circuit rendered effective by the operation of said polarized relay to transmit a momentary signal to the composite signaling means in the branch exchange, and means in said outgoing trunk circuit rendered effective by the momentary signal received by said composite signaling means in the branch office for switching said calling line from said trunk line to said attendant's position.

PRESTON R. GRAY.

REFERENCES CITED

The following references are of record in the file of this patent:

UNITED STATES PATENTS

| Number | Name | Date |
|---|---|---|
| 1,639,445 | Waschnack | Aug. 16, 1927 |
| 2,039,668 | Stokely | May 5, 1936 |
| 2,040,291 | Bonomi | May 12, 1936 |